United States Patent
Yang et al.

(10) Patent No.: US 11,304,028 B2
(45) Date of Patent: Apr. 12, 2022

(54) INFERENCE OF LOGISTICAL RELATIONSHIPS FROM DEVICE LOCATION DATA

(71) Applicant: Orbital Insight, Inc., Palo Alto, CA (US)

(72) Inventors: Zeqi Yang, London (GB); Hadley O. Johnson, San Diego, CA (US)

(73) Assignee: Orbital Insight, Inc., Palo Alto, CA (US)

( * ) Notice: Subject to any disclaimer, the term of this patent is extended or adjusted under 35 U.S.C. 154(b) by 0 days.

(21) Appl. No.: 17/090,774

(22) Filed: Nov. 5, 2020

(65) Prior Publication Data

US 2021/0144510 A1 May 13, 2021

Related U.S. Application Data

(60) Provisional application No. 62/933,256, filed on Nov. 8, 2019.

(51) Int. Cl.
*H04W 4/021* (2018.01)
*H04W 4/029* (2018.01)
*G06Q 30/02* (2012.01)
*G06Q 50/28* (2012.01)
*G06Q 10/10* (2012.01)

(52) U.S. Cl.
CPC .......... *H04W 4/021* (2013.01); *G06Q 10/10* (2013.01); *G06Q 30/0205* (2013.01); *G06Q 50/28* (2013.01); *H04W 4/029* (2018.02)

(58) Field of Classification Search
CPC ................................ H04W 4/04; G06Q 30/02
See application file for complete search history.

(56) References Cited

U.S. PATENT DOCUMENTS

| | | | |
|---|---|---|---|
| 2013/0267249 A1 | 10/2013 | Rosenberg | |
| 2017/0064515 A1* | 3/2017 | Heikkila | H04W 4/021 |
| 2017/0316426 A1 | 11/2017 | Weiss et al. | |
| 2018/0014161 A1 | 1/2018 | Warren et al. | |

OTHER PUBLICATIONS

Intellectual Property Office of the United Kingdom, Office Action, GB Patent Application No. 2017565.9, dated Jul. 23, 2021, ten pages.

\* cited by examiner

*Primary Examiner* — Kiet M Doan
(74) *Attorney, Agent, or Firm* — Fenwick & West LLP

(57) ABSTRACT

A system and method are disclosed for receiving a request to track data of an area of interest (AOI). The system receives a plurality of geolocation data records corresponding to a plurality of mobile devices. The system determines which mobile devices of the plurality of mobile devices have visited the AOI. For each mobile device determined to have visited the AOI, the system determines a path of the mobile device. The path including a prior location of the mobile device and a next location of the mobile device. The system transmits for display by a client device, a report including the path for each mobile device determined to have visited the AOI. The path indicating an identification of additional AOIs based on the prior location and the next location.

18 Claims, 5 Drawing Sheets

INFERENCE OF LOGISTICAL RELATIONSHIPS FROM DEVICE LOCATION DATA

CROSS-REFERENCE TO RELATED APPLICATIONS

This application claims priority to U.S. Provisional Application No. 62/933,256, filed on Nov. 8, 2019, which is hereby incorporated by reference in its entirety.

TECHNICAL FIELD

This disclosure relates generally to processing of sensor data, and, in particular, to inference of logistical relationships from device location data.

BACKGROUND

The ability to infer logistical relationships between areas of interest may be a valuable resource in many scenarios. For example, determining who the intermediaries are in a supply chain may assist a company in determining areas of risk, such as areas where disruption may halt production for the company. As another example, determining intermediaries in the supply chain may assist the company in identifying upstream suppliers who may be conducting business in an unsustainable manner.

Multiple methods may be used to determine direct and/or indirect relationships between suppliers and customers in a supply chain. A simple approach may simply be to gather input from suppliers along the chain. For example, a company may ask its suppliers for data via a software system. However, this approach has many drawbacks, such as relying on suppliers to input any data and relying on suppliers that do input data to input accurate data. Additionally, there can exist a long delay in receiving data from suppliers and high costs due to the dependence on manual workflows.

Existing technology is insufficient to automate determination of these relationships, because this technology does not enable users to define areas of interest. Thus, available data, such as mobile device location of users, is not able to be parsed using existing tools to provide granular enough information to determine these relationships.

SUMMARY

While sensor data, such as mobile device location data is tracked in the aggregate, the data is not broken down in a way that provides meaningful activity data for micro-locations. For example, the aggregate data is not useful in helping to identify relationships between different user-defined locations (e.g., a manufacturer and a supplier). Technical improvements are disclosed herein, including new uses of clustering algorithms that enable aggregate data input into a system to be applied to user-defined AOIs to find related AOIs. Disclosed by way of example embodiments are a method, system and/or computer program products (e.g., a non-transitory computer-readable storage media that stores instructions executable by one or more processors) for combining sensor data from multiple devices to determine suppliers and/or customers in a supply chain and to quantify a logistical relationship between any two in the supply chain without any input from the individual suppliers or the individual customers. The sensor data comprises geolocation data records provided by location enabled devices (e.g., mobile devices) to a mobile device location data provider. Each geolocation data record includes at least coordinates and a timestamp at which the coordinates are recorded. A plurality of geolocation data records for a plurality of mobile devices are received by an AOI logistical relationship analyzer system. The AOI logistical relationship analyzer system may also receive a request to track data of an area of interest (AOI). The AOI logistical relationship analyzer system determines which mobile devices of the plurality visited the AOI based on the geolocation data records for each mobile device. In one example, a mobile device is determined to have visited the AOI when two or more consecutive coordinates of the device's geolocation data records intersect with an AOI geographic area. For each mobile device determined to have visited the AOI, the AOI logistical relationship analyzer system determines a path of the mobile device. The path includes a prior location of the mobile device and a next location of the mobile device. The AOI logistical relationship analyzer system determines a path by gathering a subset of the geolocation records of the mobile device with timestamps taking place during a time interval. The time interval includes an amount of time before the visit to the AOI, during the visit to the AOI, and after the visit to the AOI.

After the path for each mobile device determined to have visited the AOI is determined, the AOI logistical relationship analyzer system determines which geolocation data records of the path are stationary geolocation data records. Stationary geolocation data records are determined by analyzing a velocity of each geolocation data record. Records with a velocity of substantially zero are considered stationary. The AOI logistical relationship analyzer system clusters the stationary geolocation data records into one or more groups. Each group includes geolocation data records with coordinates within a threshold distance of each other. The AOI logistical relationship analyzer system determines a geographic area for each group. Each geographic area may be identified as an additional unique AOI. The additional unique AOI(s) may be classified as a source AOI or a destination AOI based on the timestamps of the stationary geolocation data records. The AOI logistical relationship analyzer system may aggregate the one or more groups of stationary geolocation data records and the geographic areas to determine a number of mobile devices that visited each geographic area. The number of mobile devices that visited any two geographic areas may be used by the AOI logistical relationship analyzer system to quantify the logistical relationship between the two.

In one example embodiment, the AOI logistical relationship analyzer system receives a request to track data of an area of interest (AOI). The AOI logistical relationship analyzer system further receives a plurality of geolocation data records corresponding to a plurality of mobile devices, each geolocation data record including coordinates and a timestamp at which the coordinates are recorded. The AOI logistical relationship analyzer system further determines which mobile devices of the plurality of mobile devices have visited the AOI. For each mobile device determined to have visited the AOI, the AOI logistical relationship analyzer system determines a path of the mobile device. The path includes a prior location of the mobile device and a next location of the mobile device. The AOI logistical relationship analyzer system further transmits for display a report including the path for each mobile device determined to have visited the AOI. The path indicates an identification of additional AOIs based on the prior location and the next location.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

Figure 1:
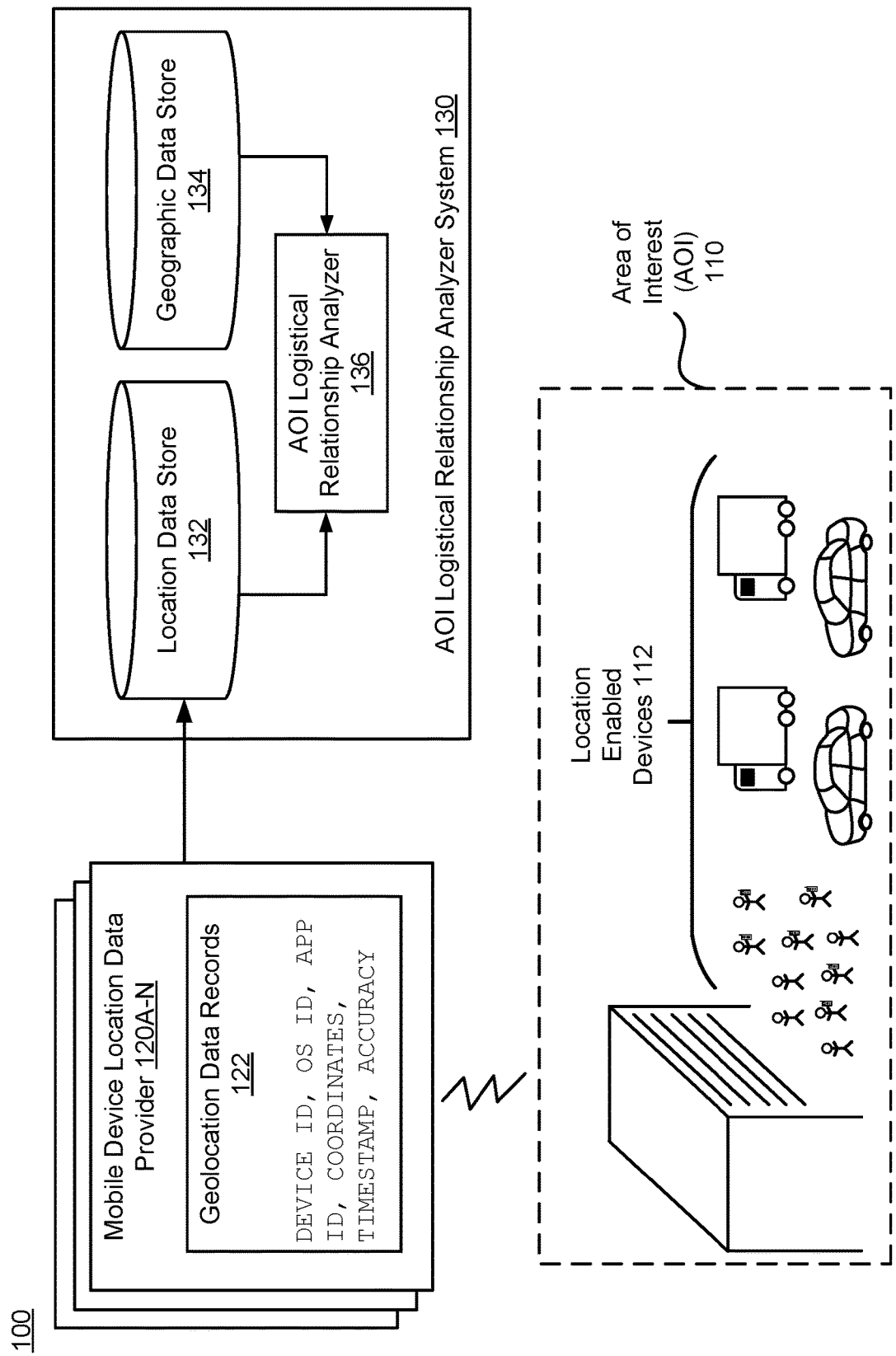
FIG. 1 illustrates an example system for inferring logistical relationships of an area of interest (AOI), in accordance with an embodiment.

Figure (FIG. 1 illustrates an example system for inferring logistical relationships of an area of interest (AOI), in accordance with an embodiment. The example system environment shown in FIG. 1 may include an area of interest (AOI) 110 with location enabled devices 112, mobile device location data providers 120A-N (generally referred to as 120 herein), and an AOI logistical relationship analyzer system 130 with location data store 132, geographic data store 134, and an AOI logistical relationship analyzer 136.

The area of interest (AOI) 110 is an area on a land surface (e.g., the surface of the Earth), and includes all features (natural and man-made) within that area. The definition of the AOI may be provided by a requestor, such as a user or third-party system, to the AOI logistical relationship analyzer system 130, e.g., by using an application programming interface (API) or graphical user interface (GUI). The AOI 110 may be defined by a closed boundary on the land surface. The closed boundary itself may be defined using various connected geographic markers, which may be indicated using geographic coordinates, such as longitude and latitude indicators. Alternatively, the AOI 110 may be defined by a set of vectors describing the closed boundary. In some cases, the AOI 110 may be defined using multiple closed boundaries, with each closed boundary defined using one of the methods noted above. The AOI 110 may also have within one of its closed boundaries an excluded area or areas. These excluded areas may also be defined using closed boundaries and are specified in a similar fashion. In another embodiment, the AOI 110 is defined using a cartographical indicator, i.e., a commonly, conventionally, administratively, or legally agreed upon indicator of a bounded area on a land surface. For example, these cartographic indicators may include a point of interest, landmark, address, postal code, city/town/village, metropolitan area, country, province/county, neighborhood, unincorporated area, a region surrounding a cartographical indicator, and so on, plus or minus a tolerance area beyond (or within) the cartographic indicators, which may be defined in absolute or percentage from the cartographic indicators. In some embodiments, the region surrounding the cartographical indicator may be defined by a default amount (e.g., a default radius around the indicator). In some embodiments, the region surrounding the cartographical indicator may be calculated based on a value defined by the requestor. For example, the cartographical indicator is an address and the value defined by the requestor is 1 mile, the region surrounding the cartographical indicator is a 1 mile radius centered at the address. The AOI 110 may further be bounded by an upper elevation and/or lower elevation limit.

The AOI 110 represents a geographic location for which information, such as a visit estimate or activity of users prior to visiting the AOI, during the visit to the AOI 110, and/or after the visit to the AOI 110, is of interest to a requesting party. For example, a vehicle manufacturer may be interested in determining who its suppliers are to determine how best to plan for any possible disruptions to its supply chain, based on a mechanism of determining the travel in and out of an AOI as part of the invention. Other examples of AOIs 110 may include factories, stores, distribution facilities, farms, oil refineries, automotive or other vehicle manufacturing facilities (e.g., recreational vehicles, aircraft), mines, retail locations, warehouses, and so on.

In one embodiment, the AOI 110 is not a location on the land surface, but a closed three-dimensional volume at any location, which may or may not be offset from the ground level. It may be defined using a plurality of three-dimensional coordinates which are connected together using planar surfaces or may be described in terms of geometric shapes.

Although the AOI 110 is shown as bounded by rectangular dotted lines in FIG. 1 for illustrative purposes, as described above, it may be defined using a variety of methods and may not correspond to rectangular boxes as shown. This may be indicated graphically or textually.

A location enabled device 112 is a device that may be able to gather, identify, and/or report location information of the device and transmit it via a network (e.g., a mobile, cellular, wireless, or other network) to an external system, such as the mobile device location data providers 120, which are further described below. Examples of location enabled device 112 include smartphones, tablets, smart watches, navigation units on vehicles, waterborne vessels, GPS trackers, laptops, etc., that is devices that use one or more means to have location information identified as well as timestamp information captured, either on the device itself or through some form of a device information capture system. The location information may be gathered using a component of the mobile device capable of receiving information from GPS or similar satellite navigation system (e.g., GLONASS, Galileo, Beidou, etc.), or may be gathered using other methods of approximating location, such as via detection of nearby Wi-Fi networks or cellular network towers. A mobile device may be associated with a user (or more than one user). A user is a person located within the AOI 110. The mobile device may be a device carried or worn by a user. In this respect it may serve as a proxy for the user and provide information about the user, and in particular the location information of that user. Therefore, by receiving mobile device usage data that includes location information, the current location of an associated user may also be inferred at a point in time. In one embodiment, a mobile device may also be referred to as a device.

The location enabled device 112 may transmit geolocation data records 122 regarding the current geographic location of the mobile device and the current time (e.g., local time or universal time/GMT) to the mobile device location data providers 120. The geographic location may be indicated using geographic coordinates, e.g., latitude, longitude, and/or nearby Wi-Fi network names, nearby cellular tower locations, or other methods, such as those used to define the AOI 110 as described above. For example, the geographic location may be indicated as a point of interest at which the mobile device is located. In some embodiments, the mobile device location data providers 120 convert the geographic coordinates, such as Wi-Fi network names, nearby cellular tower locations, or points of interest, to latitude and longitude coordinates. The current time may be indicated in varying levels of accuracy, e.g., millisecond, second, minute, or day level of accuracy. For example, the current time may be indicated in a 64-bit integer using the Unix time format.

The location enabled device 112 may transmit additional information in the geolocation data records 122, such as a mobile device identifier or signature that is anonymized, a mobile provider information, a mobile application which gathered the location data for the location enabled device 112, operating system information, version number information, an identifier of the application that provided the location information, an accuracy level, etc. The additional information in the geolocation data records 122 may be utilized by the AOI logistical relationship analyzer system 130 for the purposes of tracking a path of a same location enabled device 112 over time.

The mobile device location data providers 120 receive geolocation data records from the location enabled devices 112. This information may be stored as geolocation data records 122 and may be received in whole or in part (e.g., excluding personally identifiable information) by the AOI logistical relationship analyzer system 130. Each mobile device location data provider 120 may be associated with geolocation data records 122 from a specific application, device manufacturer, device operating system, or other entity which gathers the geolocation data records 122 from a subset of all mobile devices. For example, a first set of location enabled devices 112 has installed thereupon application A, which transmits geolocation data records 122 to a mobile device location data provider 120A, while a second set of location enabled devices 112 (which may overlap with the first set) has installed thereupon an application B, which transmits geolocation data records 122 to a separate mobile device location data provider 120B. The application on the location enabled device 112 may transmit the geolocation data records 122 by accessing one or more APIs of an operating system of the mobile device in order to access a data transmission mode that allows the application to transmit the geolocation data records 122 across a network, e.g., via cellular data transmission, Wi-Fi data transmission, Bluetooth data transmission, or any other network transmission technology, to a mobile device location data provider 120, and more specifically, to one or more network servers of the mobile device location data provider 120. The geolocation data records 122 can include the location data of the location enabled device 112, which the application may access by using an API of the operating system of the mobile device as well. While the provider of the application and the mobile device location data provider 120 may be the same entity, in some cases these entities are separate, with the application provider sending the location data of the mobile devices to the mobile device location data provider 120 for collection.

The AOI logistical relationship analyzer system 130 requests the geolocation data records 122 from the mobile device location data providers 120 and stores the records 122 in the location data store 132. In some embodiments, the AOI logistical relationship analyzer system 130 requests the data based on receiving a request to track data of the AOI 110. In some embodiments, the AOI logistical relationship analyzer system 130 periodically requests the data (e.g., every day, every week, every month, every quarter, etc.). In one embodiment, data from the geolocation data records 122 received by the AOI logistical relationship analyzer system 130 include, at least: 1) geographic coordinates and 2) a timestamp. In addition, the geolocation data records 122 may include: 3) an anonymized mobile device identifier or signature, 4) an operating system identifier, 5) accuracy count, 6) application identifier, and 7) a velocity.

The AOI logistical relationship analyzer system 130 determines a path for each location enabled device 112 that has visited the AOI 110 based on the geolocation data records 122. In one embodiment, the AOI logistical relationship analyzer system 130 includes the location data store 132, geographic data store 134, and the AOI logistical relationship analyzer 136.

The location data store 132 stores geolocation data records 122 received from the location enabled devices 112 currently located within the AOI 110. The location data store 132 may also include geolocation data records 122 from location enabled devices 112 in other geographic areas, and may include all the geolocation data records 122 that the mobile device location data providers 120 can provide to the AOI logistical relationship analyzer system 130, such as for an entire country or the entire world. Each entry in the location data store 132 may include an entry of a reported geolocation data record 122 from a location enabled device 112. Any geolocation data record 122 that is incomplete may be removed from the location data store 132 by the AOI logistical relationship analyzer system 130. An incomplete geolocation data record 122 is a record that includes some but not all data for which there is an open field in the record. For example, a geolocation data record 122 that includes coordinates, but no timestamp, where the geolocation record includes fields for both coordinates and a timestamp, will be removed. The geolocation data records 122 stored in the location data store 132 may be stored indefinitely or may be stored for a particular time period (e.g., for one year, for two years, etc.).

The geographic data store 134 stores geographic information that the AOI logistical relationship analyzer system 130 may use to determine the locations of the location enabled devices 112 in the location data store 132 in relation to the AOI 110. In particular, the AOI logistical relationship analyzer 136 may use the geographic data store 134 to determine if a reported location from a location enabled device 112 is within the boundaries indicated by the definition of the AOI 110. In one embodiment, the geographic data store 134 may also store information indicating a number of location enabled devices 112 within different geographic areas at a particular time or during one or more particular periods of time. The information in the geographic data store 134 may be retrieved from a third-party (e.g., a satellite data provider, government census records, etc.).

The AOI logistical relationship analyzer 136 determines which location enabled devices 112 visited the AOI 110 over time (or at a specific point in time) using the geolocation data records 122 stored in the location data store 132. To make this determination, the AOI logistical relationship analyzer 136, after receiving the definition (e.g., longitude and latitude indicators, boundary indications, and the like) of the AOI 110, accesses the location data store 132 to retrieve geolocation data records 122 for location enabled devices 112 present at the AOI 110 over a period of time (e.g., the current time, the last hour, last day, last week, last month, etc.). The AOI logistical relationship analyzer 136 may use the geographic data store 134 to determine the geographic locations/coordinates that are within the boundaries of the AOI 110, and may find the geolocation data record entries in the location data store 132 that match the geographic location and/or coordinates of the AOI 110. The AOI logistical relationship analyzer 136 may specifically find geolocation data record entries that include two or more consecutive geographic coordinates that intersect the geographic locations/coordinates of the AOI 110 for at least a portion of the period of time.

The AOI logistical relationship analyzer 136, after determining which location enabled devices 112 visited the AOI 110, determines a path for those particular location enabled device 112 over a time interval. The time interval may be predefined by the requestor of the AOI logistical relationship analyzer system 130 or may be dynamically determined by the AOI logistical relationship analyzer 136. The time interval can include an amount of time before a location enabled device 112 visited the AOI 110, during the location enabled device 112 visit to the AOI 110, and after the location enabled device 112 visited the AOI 110. To make this determination, the AOI logistical relationship analyzer 136 accesses the location data store 132 to retrieve the geolocation data records 122 for location enabled devices 112 that visited the AOI 110. The geolocation data records 122 are filtered to include only geolocation data records 122 with timestamps that fall within the time interval. The filtered geolocation data records 122 for each location enabled device 112 make up the path for that particular device 112.

After determining a path for each location enabled device 112 that visited the AOI 110, the AOI logistical relationship analyzer 136 may determine where the location enabled devices 112 stopped (or visited) prior to visiting the AOI 110 or after leaving the AOI 110. To make this determination, the AOI logistical relationship analyzer 136 can determine a velocity for each individual geolocation data record 122 along the path. In one embodiment, the AOI logistical relationship analyzer 136 may calculate the velocities. In some embodiments, the AOI logistical relationship analyzer 136 determines the velocity for each individual geolocation data record 122. In some embodiments, the AOI logistical relationship analyzer 136 stores the velocity in the geolocation data record entry. In some embodiments, the AOI logistical relationship analyzer 136 determines velocities as needed and does not store the velocities. The AOI logistical relationship analyzer 136 may compare the velocity of each individual geolocation data record 122 to a threshold amount of velocity. Responsive to determining the velocity is below the threshold amount of velocity, the AOI logistical relationship analyzer 136 determines that the particular geolocation data record 122 is a stationary geolocation data record.

The AOI logistical relationship analyzer 136 may determine other metadata for location enabled devices 112 determined to have visited the AOI 110. For example, the AOI logistical relationship analyzer 136 may determine an average distance traveled over some specified time period (e.g., a day, a week, etc.), a minimum velocity, a maximum velocity, an average velocity, and/or a frequency of visiting the AOI 110. The AOI logistical relationship analyzer 136 may utilize the metadata to determine which location enabled devices 112 belong to users that are related to logistical movements (e.g., location enabled devices 112 belonging to truck drivers as opposed to location enabled devices 112 belonging to employees of the AOI 110). Determining which location enabled devices 112 belong to users that are related to logistical movements may provide greater confidence in a strength of relationship determined by the AOI logistical relationship analyzer 136 between the AOI 110 and other identified AOIs. In some embodiments, the AOI logistical relationship analyzer 136 may apply a machine learning model to the geolocation data records 122 associated with the location enabled devices 112 determined to have visited the AOI 110 to identify which location enabled devices 112 belong to users that are related to logistical movements. The AOI logistical relationship analyzer 136 can exclude any stationary geolocation data records associated with location enabled devices 112 belonging to users not related to logistical movements.

After determining the stationary geolocation data records, the AOI logistical relationship analyzer 136 clusters the stationary geolocation data records into one or more groups. A group of stationary geolocation data records includes geolocation data records 122 with coordinates that are within a threshold distance of each other. The threshold distance may be predefined by a requestor of the AOI logistical relationship analyzer system 130 or may be dynamically determined by the AOI logistical relationship analyzer 136. The AOI logistical relationship analyzer 136 may identify a geographic area for each group of stationary geolocation data records. The geographic area can encompass the coordinates of the stationary geolocation data records in the group. For example, the AOI logistical relationship analyzer 136 may generate a convex hull of all coordinates belonging to a group of stationary geolocation data records. The AOI logistical relationship analyzer 136 may determine to exclude a particular group of stationary geolocation data records based on a minimum size of the geographic area corresponding to the group and/or a minimum number of location enabled devices 112 that correspond to the group. The minimum size of the geographic area and/or the minimum number of location enabled devices 112 may be defined by the requestor as system limits. The system limits are based on privacy considerations (e.g., a small geographic area may correspond to a user's home).

After determining the one or more groups of stationary geolocation data records and corresponding geographic areas, the AOI logistical relationship analyzer 136 can exclude one or more of the groups of stationary geolocation data records based on a minimum size of the geographic area corresponding to the group or based on a minimum number of location enabled devices 112 that correspond to the group. The AOI logistical relationship analyzer 136 identifies an additional unique AOI as being located within each identified geographic area that remains. The AOI logistical relationship analyzer 136 may aggregate the one or more groups of stationary geolocation data records and determine a number of location enabled devices 112 that visited each identified additional unique AOIs based on coordinates of the stationary geolocation data records intersecting the geographic area of the additional unique AOIs. The AOI logistical relationship analyzer 136 may identify an additional unique AOI as a source AOI or a destination AOI. The additional unique AOI is identified as a source AOI responsive to the AOI logistical relationship analyzer 136 determining that timestamps of the stationary geolocation data records corresponding to this additional unique AOI precede the visit to the AOI 110. The additional unique AOI is identified as a destination AOI responsive to the AOI logistical relationship analyzer 136 determining that timestamps of the stationary geolocation data records corresponding to this additional unique AOI follow the visit to the AOI 110.

The AOI logistical relationship analyzer 136 may report the path for each location enabled device 112 determined to have visited the AOI 110 to a requestor, i.e., a user who requested to track data of the AOI 110 and/or provided the definition of the AOI 110. The report may be transmitted for display to a client device of the requestor. The report may be anonymized such that no user account and/or mobile device identifier information is shared. In some embodiments, the report may be a visual representation (e.g., a listing) of an aggregate number of location enabled devices 122 that visited the AOI 110 and any of the additional unique AOIs. The AOI logistical relationship analyzer 136 may include additional information in the report. For example, the report may further identify and quantifying a logistical relationship between the additional unique AOIs and the AOI 110 based on the number of location enabled devices 112 that visited both the AOI 110 and the additional unique AOI. The report may include a representation of a geographic area for each group of stationary geolocation data records (i.e., a representation of a geographic area for each additional unique AOI). The report can include a visual mapping indicating a representation of the following, for each location enabled device 112 determined to have visited the AOI 110, a visit start timestamp of the visit that indicates a first point in time at which coordinates from the location enabled device 112 intersect with the AOI 110, and a visit end timestamp of the visit that indicates a last point in time at which coordinates from the location enabled device 112 intersect with the AOI 110. Other additional information may be included in the report as a representation by the AOI logistical relationship analyzer 136, such as a dwell time at the AOI 110 and/or at an additional unique AOI (i.e., how long a location enabled device 112 is at the AOI 110 and/or how long the location enabled device 112 is at the additional unique AOI) and a duration of travel between one AOI (e.g., the AOI 110) to another AOI (e.g., an additional unique AOI). The representation is a transformation of any displayed data to ensure privacy of users.

Additional details regarding the AOI logistical relationship analyzer 136 are described below with reference to FIG. 2.

By using the AOI logistical relationship analyzer system 130, a requestor can more accurately determine additional unique AOIs and a strength of a relationship between the AOI 110 and each additional unique AOI from geolocation data records 122. The strength of the relationship indicates a level of connection between the AOI and each additional unique AOI. For example, a strength of the relationship between an AOI and an additional unique AOI is stronger when a greater number of location enabled devices 112 that visited the AOI also visited the additional unique AOI. This data may be used to determine, for different types of AOIs, valuable information about the AOI 110 and its supply chain. For example, the determination of additional unique AOIs may be used by a manufacturer (e.g., the AOI 110) to more accurately determine who their suppliers are and the strength of the relationship may be used to more accurately determine how bad a disruption at one or more of the suppliers may be to the manufacturer's business. In some embodiments, the geolocation data records 122 are anonymized, with no personal information shared, the determinations and estimates provided by the AOI logistical relationship analyzer 136 also adhere to privacy regulations, allowing for the sharing of accurate data but not at the expense of revealing personally identifiable information.

Example Block Flow for the AOI Logistical Relationship Analyzer System

Figure 2:
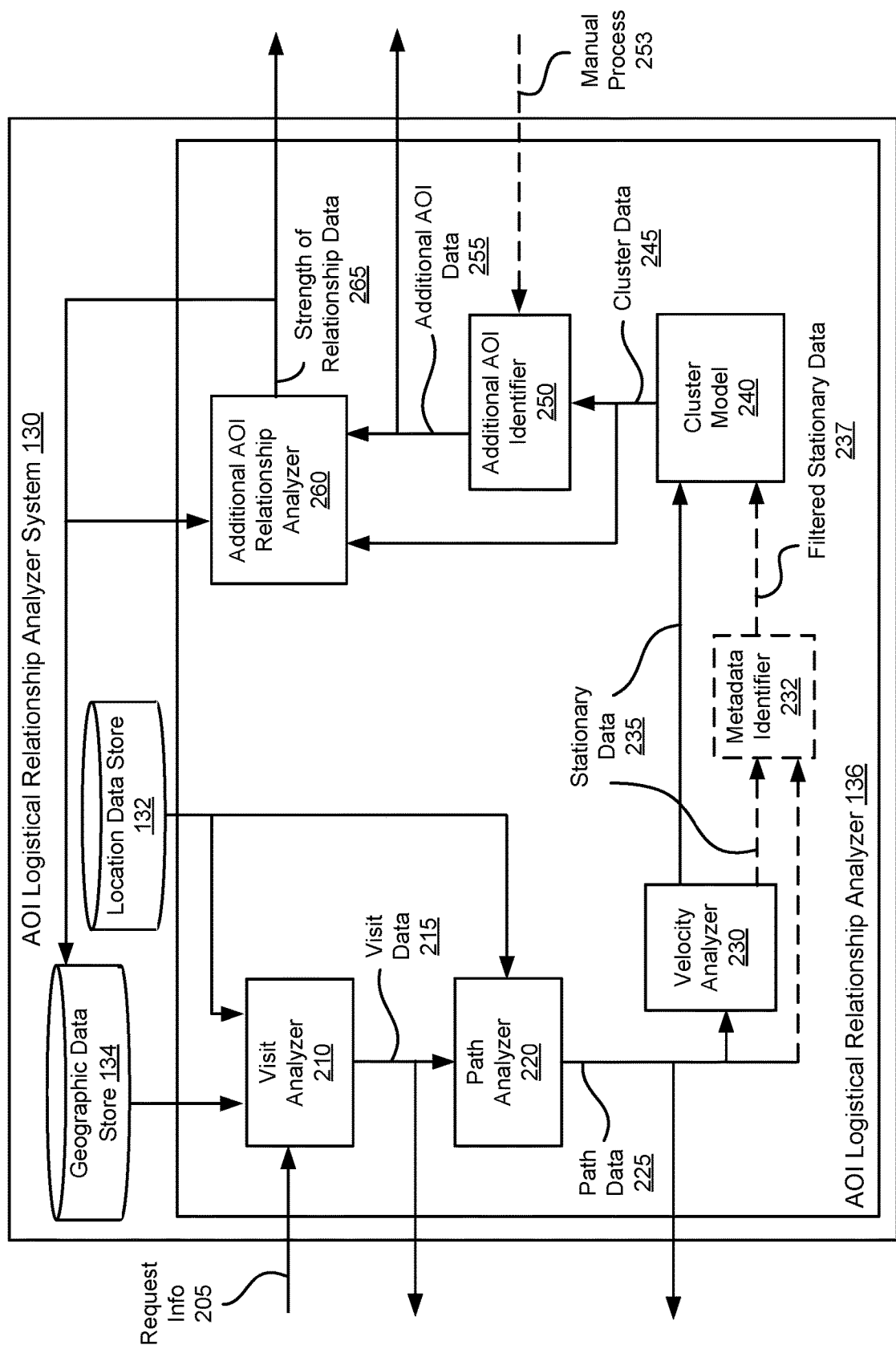
FIG. 2 is a block diagram illustrating an example flow for an AOI logistical relationship analyzer system for determining visits of users to an AOI and for analyzing paths of the users to determine additional AOIs and strength of relationship of relationship between the AOIs, in accordance with an embodiment.

FIG. 2 is a block diagram illustrating an example flow for an AOI logistical relationship analyzer system for determining visits of users to an AOI and for analyzing paths of the users to determine additional AOIs and strength of relationship between the AOIs, in accordance with an embodiment. FIG. 2 illustrates the process in the AOI logistical relationship analyzer system 130 for tracking data of an AOI and analyzing the data to infer logistical relationships of the AOI of FIG. 1. As shown, the AOI logistical relationship analyzer system 130 includes the location data store 132, the geographic data store 134, and the AOI logistical relationship analyzer 136. The AOI logistical relationship analyzer 136 includes a visit analyzer 210 to generate visit data 215, a path analyzer 220 to generate path data 225, a velocity analyzer 230 to generate stationary data 235, a cluster model 240 to generate cluster data 245, an additional AOI identifier 250 to generate the additional AOI data 255, and an additional AOI relationship analyzer 260 to generate strength of relationship of relationship data 265. The AOI logistical relationship analyzer 136 may also include an optional metadata identifier 232 to generate weighted stationary data 237. In various embodiments, the AOI logistical relationship analyzer system 130 may include fewer or additional components that are not shown in FIG. 2. In some embodiments, the functions of the AOI logistical relationship analyzer system 130 may be distributed among the components in a different manner than described.

The visit analyzer 210 receives request information 205 from a client device of a requestor and determines which location enabled devices 112 have visited an AOI specified in the request information 205. The client device of the requestor provides a user interface in which the requestor provides the request information 205 to the AOI logistical relationship analyzer system 130. The request information 205 may include a definition of an AOI and a period of time. In some embodiments, the request information 205 may include a definition of more than one AOI and a period of time or multiple periods of time. To determine which location enabled devices 112 visited an AOI (e.g., the AOI 110), the visit analyzer 210 may accesses the location data store 132 to retrieve a plurality of geolocation data records 122 corresponding to a plurality of location enabled devices 112 with timestamps that take place during the period of time (e.g., the last hour, last day, last week, last month, etc.) specified in the request information 205. The visit analyzer 210 may use the geographic data store 134 to determine if any of the coordinates of the plurality of geolocation data records 122 are located within the boundaries indicated by the definition of the AOI. For example, the visit analyzer 210 compares the definition of the AOI with the coordinates of the plurality of geolocation data records 122 to determine which geolocation data records 122 include coordinates that intersect with the boundary definition of the AOI. The geolocation data records 122 with timestamps that take place during the period of time and with coordinates located within the boundaries of the AOI are further analyzed by the visit analyzer 210 to determine which location enabled devices 112 visited the AOI.

The visit analyzer 210 may determine a location enabled device 112 visited the AOI when the location enabled device 112 is associated with geolocation data records 122 with two or more consecutive coordinates intersecting with the AOI during at least a portion of the period of time. The visit analyzer 210 generates visit data 215 which may include all location enabled devices 112 determined to have visited the AOI. The visit data 215 is anonymized so as to not include any private mobile device identifier information. The visit data 215 may further include, for each location enabled device 112 determined to have visited the AOI, a visit start timestamp of the visit that indicates a first point in time at which coordinates from the location enabled device 112 intersect with the AOI, and a visit end timestamp of the visit that indicates a last point in time at which coordinates from the location enabled device 112 intersect with the AOI. Any or all of the visit data 215 may be output to the client device as a visual mapping (e.g., a list, a table, a map, etc.) of the data indicating a representation of the data. Additionally or alternatively, the visit data 215 is provided to the path analyzer 220 for further analysis.

The path analyzer 220 determines a path for each location enabled device 112 determined to have visited the AOI per the visit data 215. The path may include all geolocation data records 122 (i.e., coordinates and corresponding timestamps) within a time interval. The path includes a prior location of each location enabled device 112 and a next location of each location enabled device 112. The prior location being a position of the location enabled device 112 prior to the device visit to the AOI and the next location being a position of the location enabled device 112 after the device visit to the AOI. The time interval includes an amount of time before the visit to the AOI, during the visit to the AOI, and after the visit to the AOI. The time interval may be predefined and provided in the request information 205 or the time interval may be dynamically determined by the path analyzer 220. The time interval may be, for example, one day, two days, five days, seven days, etc. The path analyzer 220 accesses the location data store 132 for geolocation data records 122 associated with the location enabled devices 112 determined to have visited the AOI with timestamps that take place during the time interval. Thus, the path analyzer 220 is gathering a subset of the geolocation data records 122 for those particular location enabled devices 112. The subset of geolocation data records 122 for a location enabled device 112 is the path for that device. The path for each location enabled device 112 determined to have visited the AOI (i.e., the path data 225) may be provided to the client device as a visual mapping indicating a representation of the data. Additionally or alternatively, the path data 225 is provided to the velocity analyzer 230 for further analysis.

The velocity analyzer 230 receives the path data 225 and determines a velocity for each individual geolocation data record 122 along the path of each location enabled device 112. In one embodiment, to determine the velocity for each geolocation data record 122 the velocity analyzer 230 determines an amount of distance travelled between a current geolocation data record 122 (i.e., a current coordinate) and a previous geolocation data record 122 (i.e., a previous coordinate) and determines the time elapsed between the two geolocation data records 122 (i.e., a difference between the current timestamp and the previous timestamp). The velocity analyzer 230 divides the amount of distance by the time elapsed to determine the velocity for the current geolocation data records 122. In other embodiments, the geolocation data records 122 may include a velocity for each individual geolocation data records 122.

In some embodiments, the velocity analyzer 230 excludes certain velocities based on an elapsed time threshold so that inaccurate (unrealistic) velocities are not considered in future calculations performed by the AOI logistical relationship analyzer 136. For example, when the time elapsed between two consecutive geolocation data records 122 is equal to or greater than the elapsed time threshold (e.g., 20 minutes, 30 minutes, etc.) the velocity of the current geolocation data record 122 is excluded.

The velocity analyzer 230 determines stationary geolocation data records along the path of each location enabled device 112 determined to have visited the AOI. A stationary geolocation data record signifies the user of the corresponding location enabled device 112 is remaining substantially in the same place. The velocity analyzer 230 compares the velocity of each geolocation data record 122 to a threshold amount of velocity (e.g., 5 mph, 2 mph, 8 km/h, 2 km/h). Responsive to a velocity being less than the threshold amount of velocity, the velocity analyzer 230 determines the corresponding geolocation data record 122 to be a stationary geolocation data record. The velocity analyzer 230 outputs all stationary geolocation data records for each location enabled device 112 determined to have visited the AOI as stationary data 235.

In some embodiments, the metadata identifier 232 receives the path data 225 and the stationary data 235 and determines additional metadata (e.g., additional information) about a path for each location enabled device 112 determined to have visited the AOI. For example, the metadata identifier 232 may determine an average distance traveled by each location enabled device 112 over some specified time period less than or equal to the time interval, a minimum velocity, a maximum velocity, an average velocity, and/or a frequency of visiting the AOI over the time interval. In some embodiments, the metadata identifier 232 may utilize the additional metadata to determine which location enabled devices 112 belong to users that are related to logistical functions. For example, a user related to logistical functions may travel a greater distance over the specified time period versus a user not related to logistical functions. In another example, an employee of the AOI (i.e., a user not related to logistical functions) will frequently visit the AOI over a seven-day time period, whereas a truck driver picking up a load at the AOI (i.e., a user related to logistical functions) may only visit the AOI once a week.

Additionally or alternatively, the metadata identifier 232 may apply a machine learning model to the geolocation data records 122 associated with the location enabled devices 112 determined to have visited the AOI to identify which location enabled devices 112 belong to users that are related to logistical functions. The machine learning model may be trained by accessing historical data of geolocation data records 122 having visited the AOI and determining, for each corresponding location enabled device 112 in the historical data, those devices 112 that belong to users that perform logistical functions for an entity at the AOI and those devices 112 that belong to users that do not perform logistical functions for the entity at the AOI. The metadata identifier 232 may retrieve the historical data from the location data store 132. The training data may include the geolocation data records 122 and a corresponding label for each record 122. The label identifies the geolocation data record 122 as either belonging to a user that performs logistical functions or belonging to a user that does not perform logistical functions. The label may be a binary number (e.g., 0 corresponds to a user that does not perform logistical functions and 1 corresponds to a user that does) or a probability that the user performs logistical functions (e.g., 0.6 probability the user performs a logistical function). The metadata identifier 232 provides as inputs to the trained machine learning model the geolocation data records 122 of location enabled devices 112 determined to have visited the AOI. The machine learning model predicts which location enabled devices 112 belong to users performing logistical functions (e.g., outputs a probability). The metadata identifier 232 may compare the probability with a threshold probability (e.g., 0.55, 0.6, 0.65, etc.). Responsive to the probability being equal to or greater than the threshold probability, the metadata identifier 232 determines the location enabled device 112 belongs to a user that performs logistical functions.

The metadata identifier 232 may exclude some stationary geolocation data records of the stationary data 235 based on whether the stationary geolocation data records are associated with location enabled devices 112 belonging to users related to logistical functions. For instance, stationary geolocation data records associated with a location enabled device 112 not belonging to a user related to logistical functions may be removed from the stationary data 235. The metadata identifier 232 outputs filtered stationary data 237 which includes some or all of the stationary data 235.

The cluster model 240 receives either the stationary data 235 or the filtered stationary data 237 and identifies one or more groups of stationary geolocation data records. Each group of stationary geolocation data records includes stationary geolocation data records with coordinates that are within a threshold distance of each other.

In some embodiments, the cluster model 240 utilizes a clustering algorithm as an unsupervised machine learning model to identity the one or more groups of stationary geolocation data records that are closely spaced (i.e., within a threshold distance of each other). Each group may correspond to a single location where the corresponding location enabled devices 112 may have stopped (e.g., visits to potential additional AOIs). In one embodiment, the clustering algorithm used by the cluster model 240 may be density-based spatial clustering of applications with noise (DB-SCAN) which requires two parameters: an epsilon parameter and a minimum points parameter. In other embodiments, a different clustering algorithm may be used by the cluster model 240. The cluster model 240 may apply a weight to the stationary geolocation data records. For example, a weight for a stationary geolocation data record may be calculated as an inverse exponential of the velocity of the stationary geolocation data record (i.e., weight=exp (−v), where v is the velocity). Thus, a truly stationary geolocation data record (where v=0) would have a weight of 1 while an almost stationary geolocation data record (where v=0.5 m/s) would have a weight of approximately 0.607.

In some embodiments, to reduce the number of stationary geolocation data records input into the clustering algorithm, the cluster model 240 may determine all stationary geolocation data records with the same coordinates and provide as input to the clustering algorithm only one of those stationary geolocation data records. In some embodiments, the cluster model 240 may determine all stationary geolocation data records with coordinates that are within a certain distance to each other and provide as input to the clustering algorithm only one of those stationary geolocation data records Each group of stationary geolocation data records are output as cluster data 245 and provided to the additional AOI identifier 250 and the additional AOI relationship analyzer 260. The additional AOI identifier 250 identifies a geographic area that corresponds to each group of stationary geolocation data records. The geographic area may encompass the coordinates of the stationary geolocation data records in each group. For example, the additional AOI identifier 250 may aggregate all the coordinates of the stationary geolocation data records in a group and generate a convex hull of the coordinates.

The additional AOI identifier 250 may determine to exclude a particular geographic area based on a minimum size of the geographic area. For example, the additional AOI identifier 250 excludes a geographic area that include coordinates making up a geographic area of less than 5,000 square meters. The additional AOI identifier 250 may determine to exclude a particular geographic area based on a minimum number of location enabled devices 112 that correspond to the group of stationary geolocation data records corresponding to that geographic area. For example, the additional AOI identifier 250 excludes a geographic area that include stationary geolocation data records associated with less than 5 location enabled devices 112.

In some embodiments, the geographic area for some or all of the groups of stationary geolocation data records may be modified by an optional manual process 253. For example, a requestor who provided the request info 205 to the AOI logistical relationship analyzer 136 may modify the geographic area(s). In another example, a different user associated with the AOI logistical relationship analyzer system 130 may modify the geographic area(s). Modifications may include increasing or decreasing the size of a geographic area or excluding a geographic area. For example, via a manual process 253 of comparing a current geographic area determined by the additional AOI identifier 250 that encompasses the coordinates of a group of stationary geolocation data records with a base map of the area in question, the requestor or user may determine the current geographic area only covers part of an existing factory. The requestor or user may increase the size of the current geographic area to include the entire area covered by the factory. In another example, via a manual process 253 of comparing a current geographic area to a base map, the requestor or user may determine to exclude the geographic area as the geographic area coincides with a location not of interest (e.g., a gas station, a weigh station, a toll station, a house, etc.).

The additional AOI identifier 250 determines that an additional unique AOI is located within each remaining unique identified geographic area (including any of the modified geographic areas as described above). The additional unique AOIs and their corresponding geographic areas make up the additional AOI data 255 output by the additional AOI identifier 250. The additional AOI data 255 may further include a label for each additional unique AOI. To determine the label, the additional AOI identifier 250 may identify each additional unique AOI as a source AOI or a destination AOI. For example, the additional AOI identifier 250 identifies an additional unique AOI as a source AOI when the timestamps of the stationary geolocation data records corresponding to the additional unique AOI precede the timestamps of the stationary geolocation data records corresponding to the AOI (e.g., precede a visit start timestamp). The additional AOI identifier 250 identifies an additional unique AOI as a destination AOI when the timestamps of the stationary geolocation data records corresponding to the additional unique AOI follow the timestamps of the stationary geolocation data records corresponding to the AOI (e.g., follow a visit end timestamp).

The additional AOI identifier 250 transmits any or all of the additional AOI data 255 to the client device as a visual representation (e.g., a map) of the data. Additionally or alternatively, the additional AOI data 255 is provided to the additional AOI relationship analyzer 260 for further analysis.

The additional AOI relationship analyzer 260 receives the additional AOI data 255 and the cluster data 245 from the cluster model 240 and determines a strength of relationship of relationship between the AOI and each additional unique AOI. The strength indicates a level of connection between the AOI and an additional unique AOI. For example, a strength of relationship between an AOI and an additional unique AOI is stronger when a greater number of location enabled devices 112 that visited the AOI also visited the additional unique AOI. The additional AOI relationship analyzer 260 may aggregate the one or more groups of stationary geolocation data records for the location enabled devices 112 determined to have visited the AOI (i.e., the additional AOI relationship analyzer 260 aggregates the cluster data 245). The additional AOI relationship analyzer 260 determines a number of location enabled devices 112 that visited each identified geographic area (from the additional AOI data 255) based on coordinates of the stationary geolocation data records intersecting the geographic area. The number of location enabled devices 112 that visited each identified geographic area can make up the strength of relationship of relationship data 265. The additional AOI relationship analyzer 60 may output this strength of relationship data to the client device as a visual representation (e.g., a table, a map, etc.)

The additional AOI relationship analyzer 260 determines a strength of relationship of relationship between the AOI with each additional unique AOI based on the number of location enabled devices 112 that visited each additional unique AOI. In some embodiments, the additional AOI relationship analyzer 260 may rank the additional unique AOIs based on the number of location enabled devices 112 that visited each AOI. For example, the additional AOI relationship analyzer 260 may rank an additional unique AOI higher when more location enabled devices 122 visited it. A strength of relationship of relationship between the additional unique AOIs and the AOI is directly related to the ranking. The ranking and corresponding strength of relationship can make up the strength of relationship of relationship data 265. The additional AOI relationship analyzer 260 may output the strength of relationship of relationship data 265 to the client device as a visual representation (e.g., a list, a table, etc.). In some embodiments, the additional AOI relationship analyzer 260 may apply a weight to the additional unique AOIs based on the number of location enabled devices 112 that visited each AOI. For example, the additional AOI relationship analyzer 260 may apply a relative weight to an edge on a graph based on the number of location enabled devices 112 that visited each AOI. For example, the AOI relationship analyzer 260 applies a greater edge weight between the AOI (e.g., a first node on the graph) and an additional unique AOI (e.g., a second node on the graph) when the additional unique AOI has a greater number of location enabled device 112 visits. A strength of relationship between each additional unique AOI and the AOI is directly related to the corresponding edge weight. The graph with nodes and edge weights can make up the strength of relationship data 265. The additional AOI relationship analyzer 260 may output the strength of relationship data 265 to the client device as a visual representation (e.g., a graph).

The additional AOI relationship analyzer 260 may store the strength of relationship data 265 in the geographic data store 134. In some embodiments, the additional AOI relationship analyzer 260 may retrieve the data 265 during the analysis of a subsequent request to track data of the AOI. In alternative embodiments, the additional AOI relationship analyzer 260 may retrieve the data 265 on a periodic basis (e.g., every month, every 6 months, etc.) The additional AOI relationship analyzer 260 may update the stored strength of relationship data 265 based on updated numbers of location enabled device 112 visits as determined by the AOI logistical relationship analyzer system 130 repeating the process described above, outputting the updated strength of relationship data to the client device, and re-storing the updated strength of relationship data in the geographic data store 134.

Figure 3:
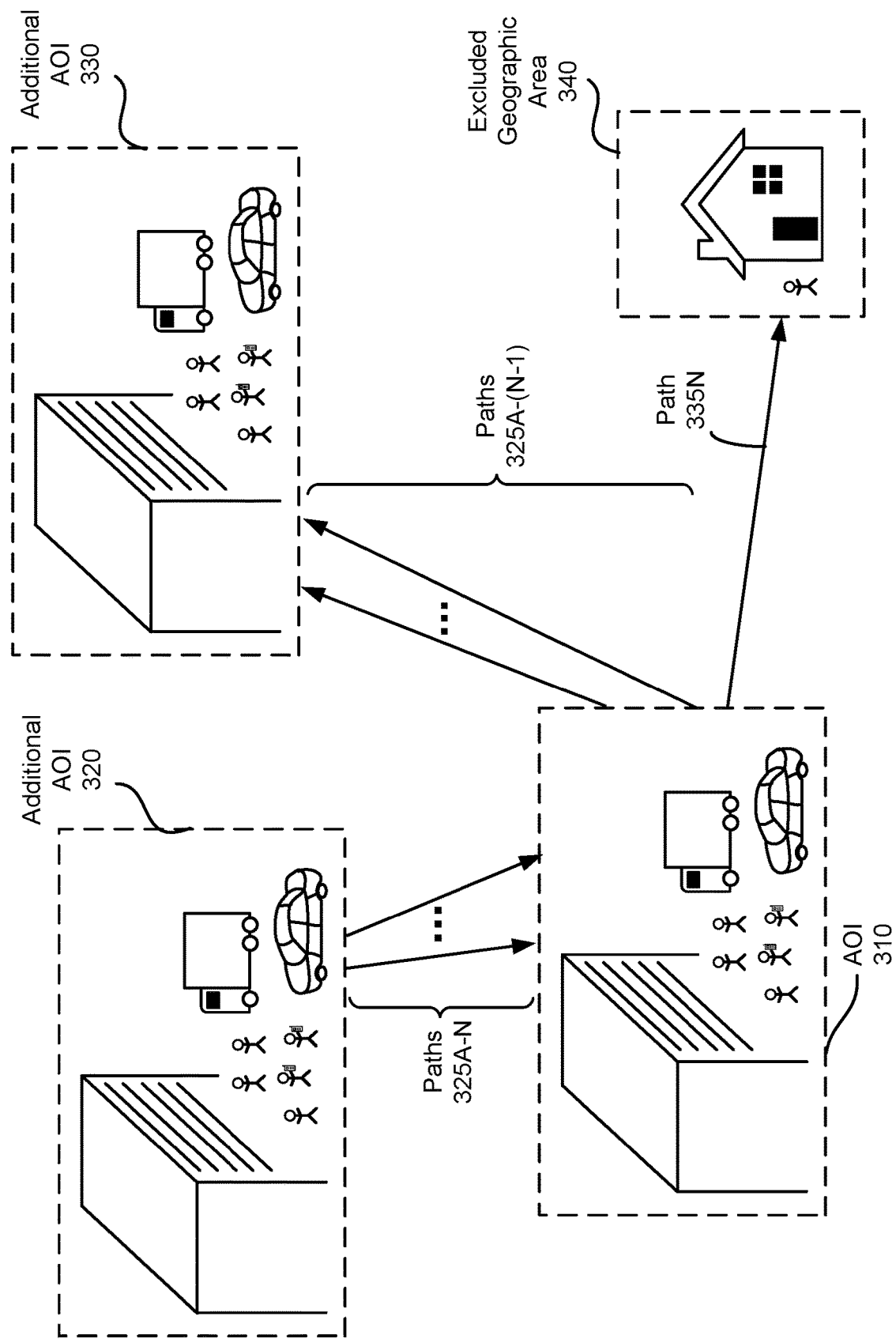
FIG. 3 illustrates an example of the determination of additional AOIs and quantifying a logistical relationship between any two AOIs using sensor data, in accordance with an embodiment.

Other additional information may be determined by the additional AOI relationship analyzer 260 such as a dwell time of each location enabled device 112 at the AOI and/or a dwell time of each location enabled device 112 determined to have visited an additional unique AOI at the additional unique AOI. The additional AOI relationship analyzer 260 may also determine a duration of travel time between one AOI (e.g., the AOI 110) to another AOI (e.g., an additional unique AOI) for each location enabled device 112. The additional information may be included in the strength of relationship data 265 and output by the additional AOI relationship analyzer 260 to the client device. Example Determination of Additional AOIs FIG. 3 illustrates an example of the determination of additional AOIs and quantifying a logistical relationship between any of the additional AOIs and the AOI using sensor data, in accordance with an embodiment.

As described above with reference to FIGS. 1 and 2, the AOI logistical relationship analyzer system 130 determines a path for each location enabled device 112 that visited an AOI 310 (i.e., each location enabled device 112 with coordinates that intersect the coordinates of the AOI 310). The path analyzer 220 determines the paths which may include paths 325A-N. Additionally, the velocity analyzer 230 determines the stationary geolocation data records of the paths 325A-N and the cluster model 240 determines one or more groups of stationary geolocation data records based on coordinates of the records being within a threshold distance of each other. The additional AOI identifier 250 identifies a geographic area that corresponds to each group of stationary geolocation data records. The additional AOI identifier 250 identifies one geographic area as an additional AOI 320 and another geographic area as an additional AOI 330. The additional AOI identifier 250 may exclude a geographic area 340 due to a limited number of location enabled devices having coordinates that overlap with this geographic area (e.g., only one) and/or due to the geographic area being smaller than a threshold size. The excluded geographic area 340 is not an additional AOI. The additional AOI relationship analyzer 260 quantifies the strength of a logistical relationship between the AOI 310 and the AOI 320 and between the AOI 310 and the AOI 330. To do so, the additional AOI relationship analyzer 260 determines how many location enabled devices 112 visited the AOI 320 prior to visiting AOI 310 and how many location enabled devices 112 visited the AOI 330 after visiting AOI 320. In the illustrated embodiment of FIG. 3, the strength of the logistical relationship between AOI 310 and AOI 320 is stronger than the logistical relationship between AOI 310 and AOI 330.

Example Machine Architecture

Figure 4:
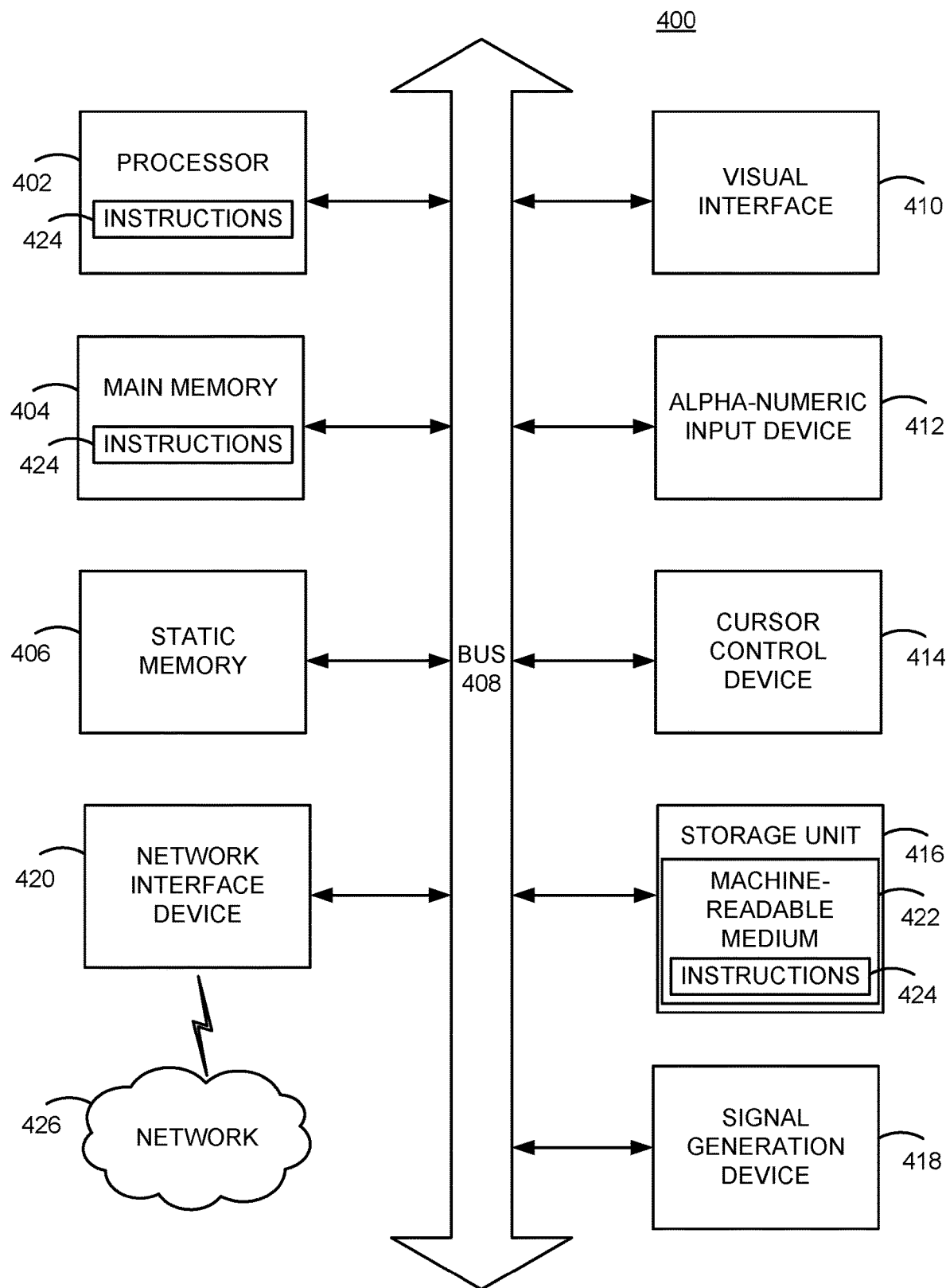
FIG. 4 is a block diagram illustrating components of an example machine able to read instructions from a machine-readable medium and execute them in a processor or controller.

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies (or processes) described herein may be executed. The program code may be comprised of instructions 424 executable by one or more processors 402. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment. It is noted the instructions correspond to the functionality of components and/or processes described herein, for example, with respect to FIGS. 1, 2, and 5.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include a visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 710 may include or may interface with a touch enabled screen. The computer system 400 also may include alpha-numeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Example Flow

Figure 5:
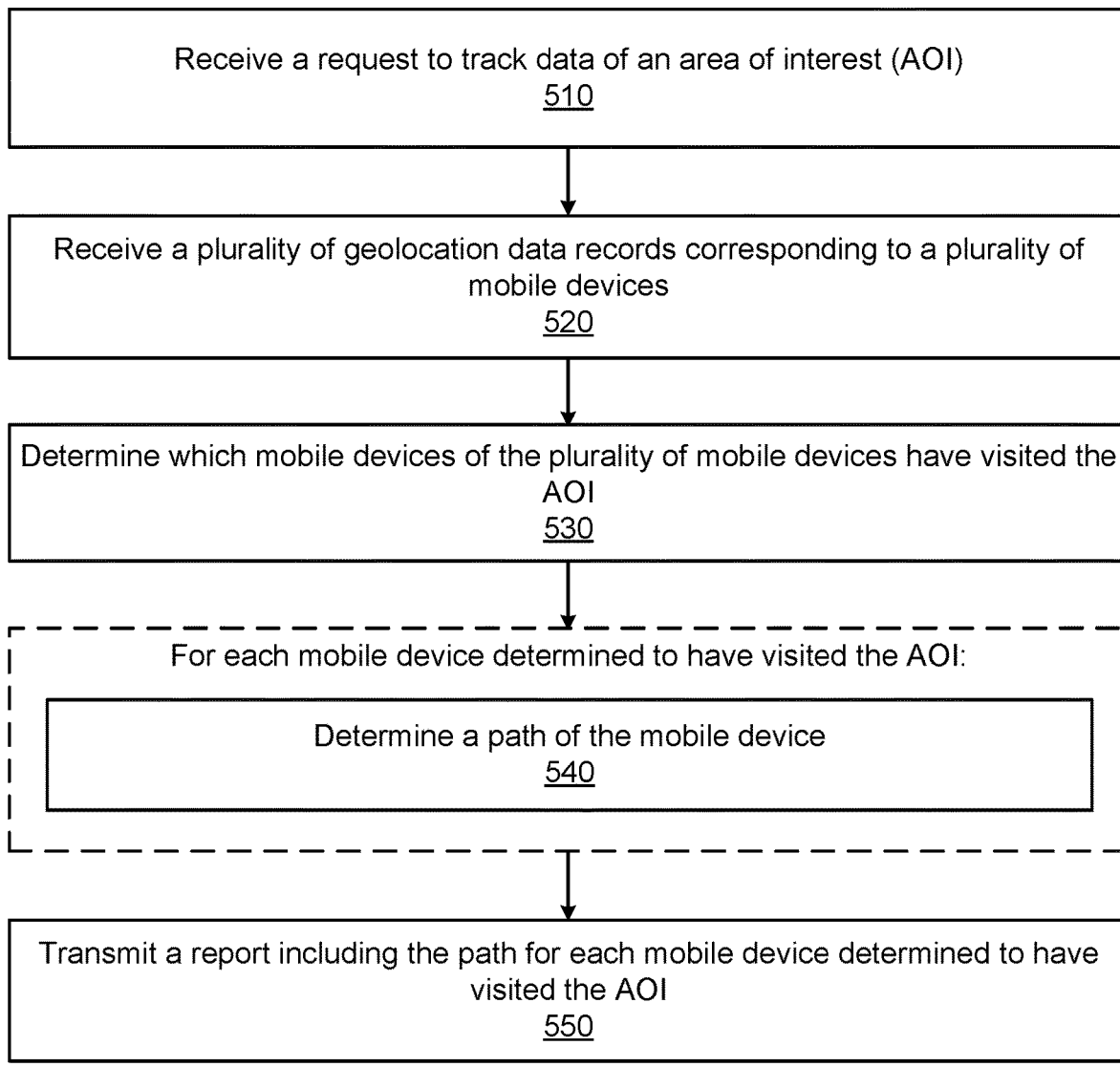
FIG. 5 is a flow diagram illustrating determination of a path for each user that visited an AOI using the AOI logistical relationship analyzer system, in accordance with an embodiment.

FIG. 5 is a flow diagram illustrating determination of a path for each user that visited an AOI using the AOI logistical relationship analyzer system.

In some example embodiments, the process may have different and/or additional steps than those described in conjunction with FIG. 5. Steps of the process may be performed in different orders than the order described in conjunction with FIG. 5. Some steps may be executed in parallel. Alternatively, some of the steps may be executed in parallel and some steps executed sequentially. Alternatively, some steps may execute in a pipelined fashion such that execution of a step is started before the execution of a previous step. In one embodiment, the process (e.g., a set of instructions 424) is performed by the AOI logistical relationship analyzer system 130 (e.g., a processor 402).

The AOI logistical relationship analyzer system 130 receives 510 a request to track data of an AOI (e.g., the AOI 110) from a client device. The request may be received by the visit analyzer 210 (e.g., executed using a processor 402) of the AOI logistical relationship analyzer system 130 via a network (e.g., the network 426). After receiving the request, the AOI logistical relationship analyzer system 130 receives 520 a plurality of geolocation data records (e.g., geolocation data records 122) corresponding to a plurality of mobile devices (e.g., location enabled devices 112). The geolocation data records may be provided (e.g., via the bus 408) to the visit analyzer 210 by the location data store 132. The AOI logistical relationship analyzer system 130 determines 530 which mobile devices of the plurality of mobile devices have visited the AOI. The visit analyzer 210 determines a mobile device has visited the AOI by determining two or more consecutive coordinates of the mobile device intersect with the AOI geographic area.

For each mobile device determined to have visited the AOI, the AOI logistical relationship analyzer system 130 determines 540 a path of the mobile device. The path includes a prior location of the mobile device and a next location of the mobile device. The path(s) may be determined by the path analyzer 220 (e.g., a processor 402) of the AOI logistical relationship analyzer system 130. The path analyzer 220 gathers a subset of the geolocation data records for a mobile device determined to have visited the AOI with timestamps taking place during a time interval. The time interval comprises an amount of time before the visit to the AOI, during the visit to the AOI, and after the visit to the AOI. The subset of the geolocation data records is the determined path of the mobile device.

The AOI logistical relationship analyzer system 130 transmits 550 a report including the path for each mobile device determined to have visited the AOI to the client device. The path for each mobile device determined to have visited the AOI may be presented for display to the client device by the path analyzer 220. The path indicates an identification of additional AOIs based on the prior location and the next location.

Additional Considerations

Beneficially, the systems and processes described herein, improve the efficiency of determining relationships between two or more locations (e.g., two or more AOIs). For example, various organizations and enterprises often rely on user input to determine logistical relationships between entities of a supply chain. Additionally, aggregate sensor data (e.g., mobile device location data) is tracked in the aggregate and not useful for determining meaningful activity data for micro-locations. For example, the aggregate data is not useful in helping to identify relationships between different user-defined locations (e.g., a manufacturer and a supplier). An AOI logistical relationship analyzer system that allows for aggregate data to be analyzed and applied to a user-defined AOI to find additional AOIs may significantly reduce time spent (e.g., manual burden) and greatly improve the accuracy of the results (e.g., not reliant on human input). The AOI logistical relationship analyzer system and processes described herein modify clustering algorithms such that aggregate sensor data may be used to determine logistical relationships between at least two AOIs.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with FIGS. 1-4. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for a system to estimate a number of users at an area of interest. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising memory with instructions encoded thereon, the instructions, when executed, causing one or more processors to perform operations, the instructions comprising instructions to:

receive, from a client device, a request to track data of an area of interest (AOD), the AOI corresponding to an AOI geographic area;

receive a plurality of geolocation data records corresponding to a plurality of mobile devices, each geolocation data record including coordinates and a timestamp at which the coordinates are recorded;

determine which mobile devices of the plurality of mobile devices have visited the AOI; for each mobile device determined to have visited the AOI, determine a path of the mobile device, the path including a prior location of the mobile device and a next location of the mobile device; and transmit for display by the client device, a report including the path for each mobile device determined to have visited the AOI, the path indicating an identification of additional AOIs based on the prior location and the next location;

wherein the instructions to determine which mobile devices of the plurality of mobile devices have visited the AOI further comprise instructions to:

determine two or more consecutive coordinates of a mobile device intersect with the AOI geographic area.

2. The non-transitory computer-readable medium of claim 1, wherein the instructions to determine the path of the mobile device further comprise instructions to:

gather a subset of geolocation data records for the mobile device with timestamps taking place during a time interval, the time interval comprising an amount of time before the visit to the AOI, during the visit to the AOI, and after the visit to the AOI, wherein the path is determined based on the subset of geolocation data records for the mobile device.

3. The non-transitory computer-readable medium of claim 2, wherein the instructions further comprise instructions to:

for each path, determine which geolocation data records of the path are stationary geolocation data records.

4. The non-transitory computer-readable medium of claim 3, wherein the instructions to determine which geolocation data records of the path are stationary geolocation data records further comprise instructions to:

for each geolocation data record of the path:
calculate a velocity for a geolocation data record;
compare the calculated velocity to a threshold amount of velocity; and
based on the calculated velocity being below the threshold amount of velocity, determine the geolocation data record to be a stationary geolocation data record.

5. The non-transitory computer-readable medium of claim 3, wherein the instructions further comprise instructions to:

cluster the stationary geolocation data records into one or more groups, each group of stationary geolocation data records including coordinates within a threshold distance of each other.

6. The non-transitory computer-readable medium of claim 5, wherein the instructions further comprise instructions to:

identify a geographic area for each group of stationary geolocation data records, the geographic area encompassing the coordinates of the stationary geolocation data records in the group; and identify an additional unique AOI located within each identified geographic area.

7. The non-transitory computer-readable medium of claim 6, wherein the instructions further comprise instructions to:

aggregate the one or more groups of stationary geolocation data records for the mobile devices determined to have visited the AOI; and determine a number of mobile devices that visited each identified geographic area based on coordinates of the stationary geolocation data records intersecting the geographic area, wherein the report further includes an inference about a logistical relationship existing between the additional unique AOI and the AOI based on the number of mobile devices that visited both the AOI and the additional unique AOI.

8. The non-transitory computer-readable medium of claim 6, wherein the instructions to identify the additional unique AOI located within each geographic area further comprise instructions to:

identify the additional unique AOI as a source AOI or a destination AOI, wherein the additional unique AOI is identified as a source AOI responsive to determining that timestamps of the stationary geolocation data records precede the visit to the AOI, and wherein the additional unique AOI is identified as a destination AOI responsive to determining that timestamps of the stationary geolocation data records follow the visit to the AOI.

9. The non-transitory computer-readable medium of claim 6, wherein the report further includes a representation of a geographic area for each group of stationary geolocation data records, the geographic area based on the coordinates of the stationary geolocation data records.

10. A method, comprising:
receiving, from a client device, a request to track data of an area of interest (AOD), the AOI corresponding to an AOI geographic area;
receiving a plurality of geolocation data records corresponding to a plurality of mobile devices, each geolocation data record including coordinates and a timestamp at which the coordinates are recorded;
determining which mobile devices of the plurality of mobile devices have visited the AOI, for each mobile device determined to have visited the AOI, determining a path of the mobile device, the path including a prior location of the mobile device and a next location of the mobile device; and
transmitting for display by the client device, a report including the path for each mobile device determined to have visited the AOI, the path indicating an identification of additional AOIs based on the prior location and the next location;
wherein determining which mobile devices of the plurality of mobile devices have visited the AOI further comprises: determining two or more consecutive coordinates of a mobile device intersect with the AOI geographic area.

11. The method of claim 10, wherein determining the path of the mobile device further comprises:
gathering a subset of geolocation data records for the mobile device with timestamps taking place during a time interval, the time interval comprising an amount of time before the visit to the AOI, during the visit to the AOI, and after the visit to the AOI, wherein the path is determined based on the subset of geolocation data records for the mobile device.

12. The method of claim 11, further comprising:
for each path, determining which geolocation data records of the path are stationary geolocation data records.

13. The method of claim 12, wherein determining which geolocation data records of the path are stationary geolocation data records comprises:
for each geolocation data record of the path:
calculating a velocity for a geolocation data record;
comparing the calculated velocity to a threshold amount of velocity; and
based on the calculated velocity being below the threshold amount of velocity, determining the geolocation data record to be a stationary geolocation data record.

14. The method of claim 12, further comprising:
clustering the stationary geolocation data records into one or more groups, each group of stationary geolocation data records including coordinates within a threshold distance of each other.

15. The method of claim 14, further comprising:
identifying a geographic area for each group of stationary geolocation data records, the geographic area encompassing the coordinates of the stationary geolocation data records in the group; and
identifying an additional unique AOI located within each identified geographic area.

16. The method of claim 15, further comprising:
aggregating the one or more groups of stationary geolocation data records for the mobile devices determined to have visited the AOI; and
determining a number of mobile devices that visited each identified geographic area based on coordinates of the stationary geolocation data records intersecting the geographic area,
wherein the report further includes an inference about a logistical relationship existing between the additional unique AOI and the AOI based on the number of mobile devices that visited both the AOI and the additional unique AOI.

17. The method of claim 15, wherein identifying the additional unique AOI located within each geographic area comprises:
identifying the additional unique AOI as a source AOI or a destination AOI, wherein the additional unique AOI is identified as a source AOI responsive to determining that timestamps of the stationary geolocation data records precede the visit to the AOI, and wherein the additional unique AOI is identified as a destination AOI responsive to determining that timestamps of the stationary geolocation data records follow the visit to the AOI.

18. A system comprising:
memory with instructions encoded thereon; and
one or more processors that, when executing the instructions, are caused to perform operations comprising:
receiving, from a client device, a request to track data of an area of interest (AOI), the AOI corresponding to an AOI geographic area;
receiving a plurality of geolocation data records corresponding to a plurality of mobile devices, each geolocation data record including coordinates and a timestamp at which the coordinates are recorded;
determining which mobile devices of the plurality of mobile devices have visited the AOT, for each mobile device determined to have visited the AOI, determining a path of the mobile device, the path including a prior location of the mobile device and a next location of the mobile device; and
transmitting for display by the client device, a report including the path for each mobile device determined to have visited the AOI, the path indicating a identification of additional AOIs based on the prior location and the next location;

wherein the instructions to determine which mobile devices of the plurality of mobile devices have visited the AOI further comprise instructions to:

determine two or more consecutive coordinates of a mobile device intersect with the AOI geographic area.

* * * * *